United States Patent
Hall et al.

(10) Patent No.: US 12,260,645 B2
(45) Date of Patent: Mar. 25, 2025

(54) SYSTEMS, METHODS, AND COMPUTER PROGRAM PRODUCTS FOR OBJECT DETECTION AND ANALYSIS OF AN IMAGE

(71) Applicant: Devon Energy Corporation, Oklahoma City, OK (US)

(72) Inventors: Amos James Hall, Sparks, OK (US); Jared Lee Markes, Edmond, OK (US); Beau Travis Rollins, Oklahoma City, OK (US); Michael Alan Adler, Jr., Edmond, OK (US)

(73) Assignee: DEVON ENERGY CORPORATION, Oklahoma City, OK (US)

( * ) Notice: Subject to any disclaimer, the term of this patent is extended or adjusted under 35 U.S.C. 154(b) by 0 days.

(21) Appl. No.: 18/409,090

(22) Filed: Jan. 10, 2024

(65) Prior Publication Data

US 2024/0144690 A1   May 2, 2024

Related U.S. Application Data

(63) Continuation of application No. 17/493,252, filed on Oct. 4, 2021, now Pat. No. 11,908,195.

(60) Provisional application No. 63/119,735, filed on Dec. 1, 2020.

(51) Int. Cl.
*G06V 20/52* (2022.01)
*G06F 18/21* (2023.01)
*G06F 18/23* (2023.01)
*G06V 10/60* (2022.01)

(52) U.S. Cl.
CPC ............ *G06V 20/52* (2022.01); *G06F 18/217* (2023.01); *G06F 18/23* (2023.01); *G06V 10/60* (2022.01)

(58) Field of Classification Search
CPC ...... G06V 20/52; G06V 10/60; G06F 18/217; G06F 18/23
See application file for complete search history.

(56) References Cited

U.S. PATENT DOCUMENTS

| | | | |
|---|---|---|---|
| 6,937,743 | B2 | 8/2005 | Rizzotti et al. |
| 7,542,585 | B2 | 6/2009 | Chen |
| 7,609,852 | B2 | 10/2009 | Chen |
| 7,859,419 | B2 | 12/2010 | Shen-Kuen et al. |
| 7,991,187 | B2 | 8/2011 | Hou |
| 9,224,278 | B2 | 12/2015 | Bernal et al. |
| 9,417,310 | B2 | 8/2016 | Meloche et al. |
| 9,520,040 | B2 | 12/2016 | Mavromatis |
| 9,530,074 | B2 | 12/2016 | Newton et al. |

(Continued)

OTHER PUBLICATIONS

"Tracking and Object Classification for Automated Surveillance", Omar Javed and Mubarak Shah, A. Heyden et al. (Eds.): ECCV 2002, LNCS 2353, 343-357, 2002.

(Continued)

*Primary Examiner* — David Perlman
(74) *Attorney, Agent, or Firm* — McAfee & Taft

(57) ABSTRACT

Systems, methods, and computer program products of intelligent image analysis using object detection models to identify objects and locate and detect features in an image are disclosed. The systems, methods, and computer program products include automated learning to identify the location of an object to enable continuous identification and location of an object in an image during periods when the object may be difficult to recognize or during low visibility conditions.

12 Claims, 13 Drawing Sheets

(56) References Cited

U.S. PATENT DOCUMENTS

| | | | |
|---|---|---|---|
| 9,958,328 B2 | 5/2018 | Cabib et al. | |
| 10,055,648 B1 | 8/2018 | Grigsby et al. | |
| 10,102,429 B2 | 10/2018 | Schnittman | |
| 10,304,306 B2 | 5/2019 | Mills et al. | |
| 10,846,867 B2 | 11/2020 | Bai | |
| 10,854,062 B2 | 12/2020 | Ebata | |
| 10,920,982 B2 | 2/2021 | Arabi et al. | |
| 2013/0275100 A1 | 10/2013 | Ellis et al. | |
| 2014/0093131 A1* | 4/2014 | Fan | G06V 20/20 |
| | | | 382/104 |
| 2018/0114158 A1 | 4/2018 | Foubert et al. | |
| 2019/0258878 A1* | 8/2019 | Koivisto | B60W 50/00 |
| 2019/0272425 A1* | 9/2019 | Tang | G06T 19/006 |
| 2020/0164814 A1 | 5/2020 | Solar et al. | |
| 2020/0387120 A1* | 12/2020 | Gurajapu | G06V 20/52 |

OTHER PUBLICATIONS

"Andium Flare Monitoring", andium.com [online]. Sep. 19, 2020. Retrieved on Jul. 22, 2022. [https://andium.com/downloads/documents/Brochures/FM/Andium%20Flare%20Monitoring.pdf].

* cited by examiner

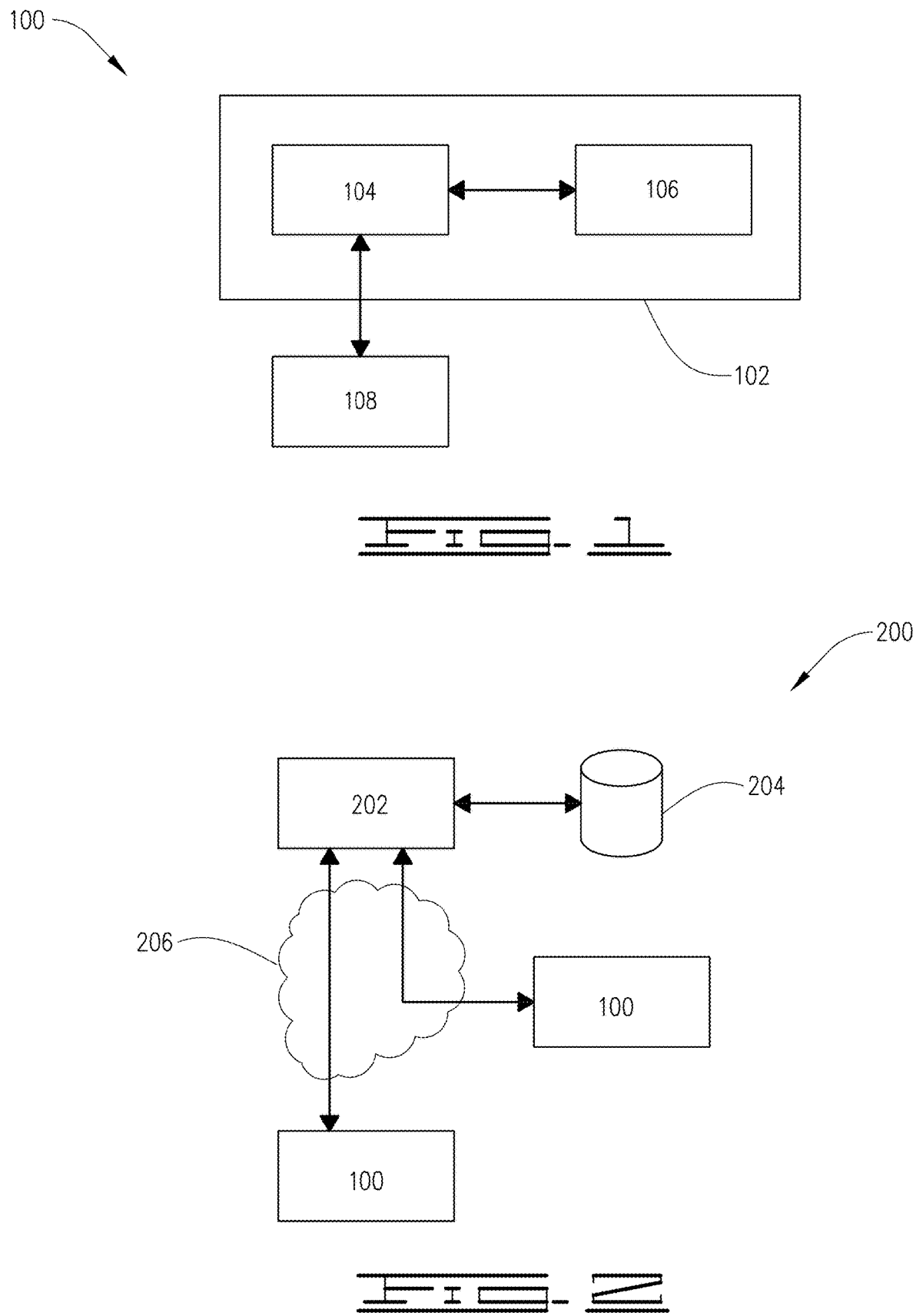

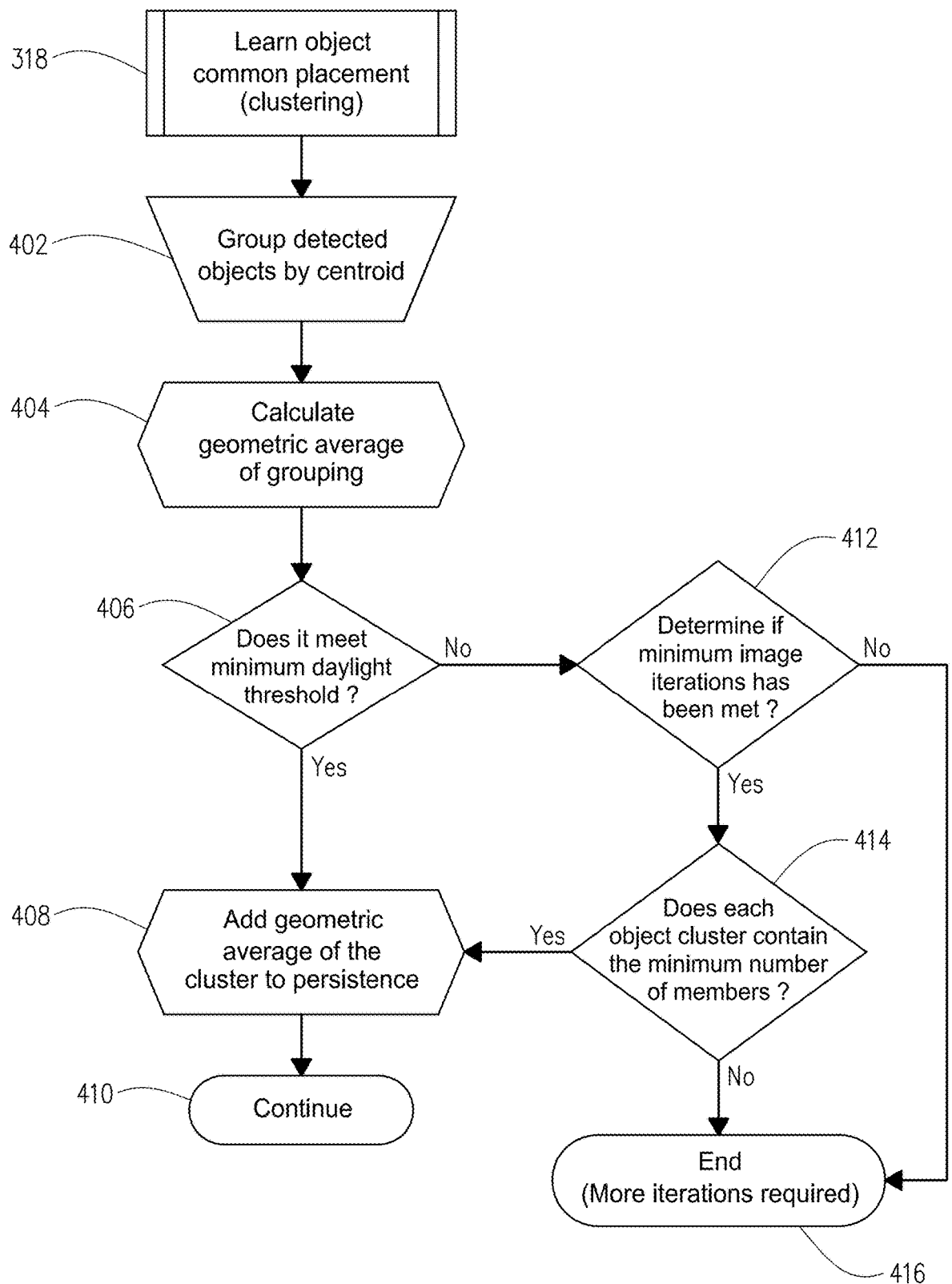

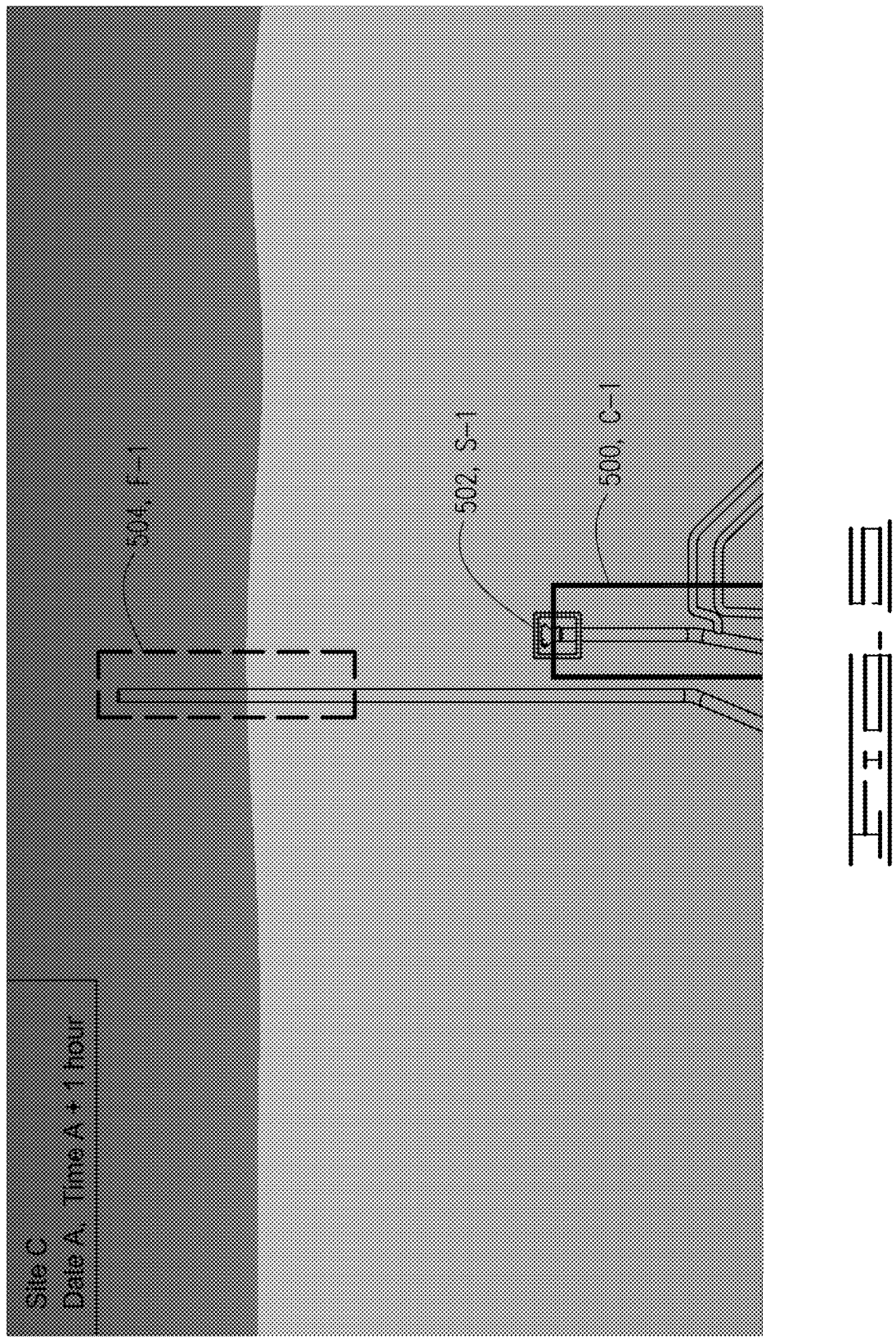

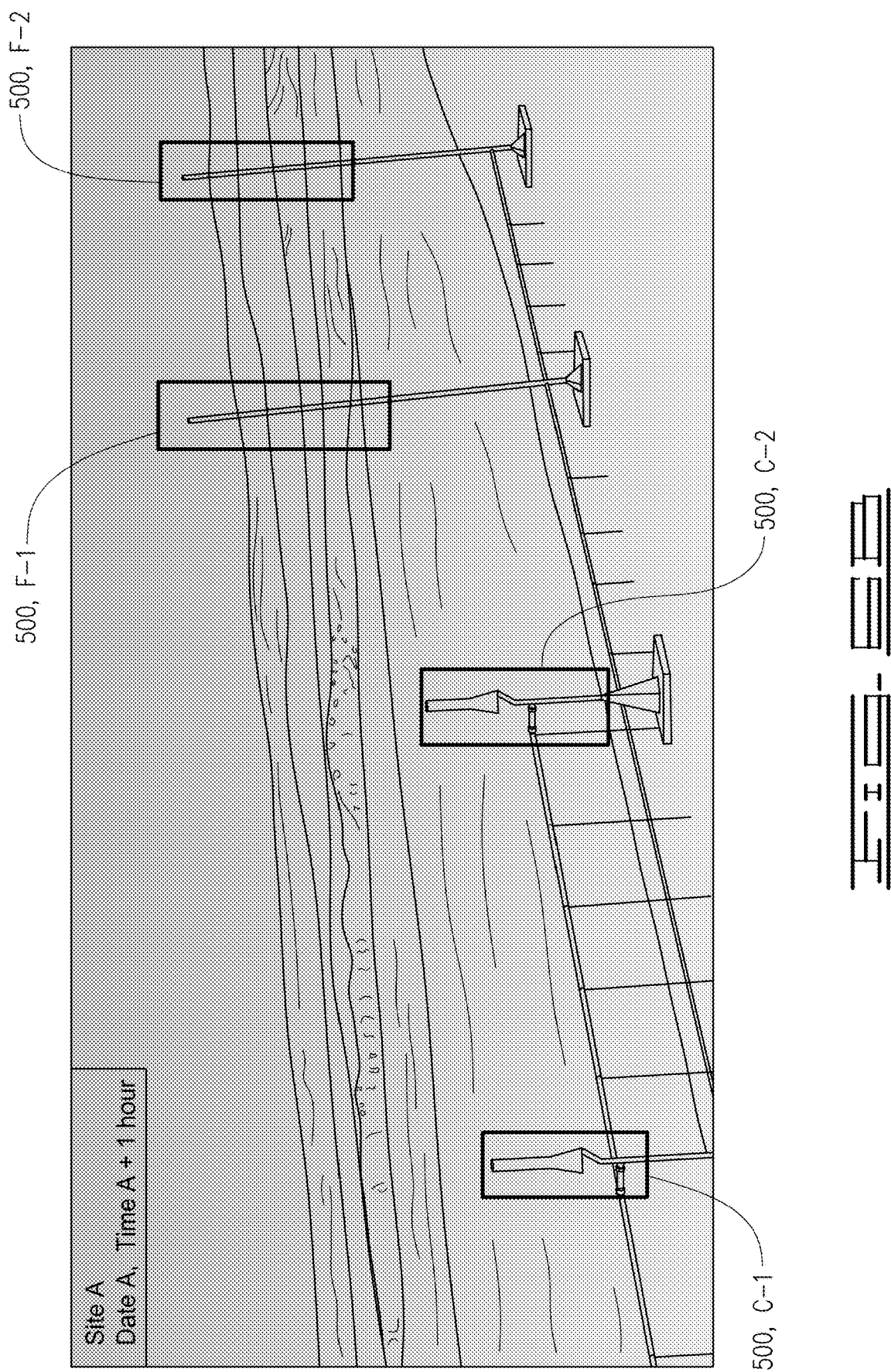

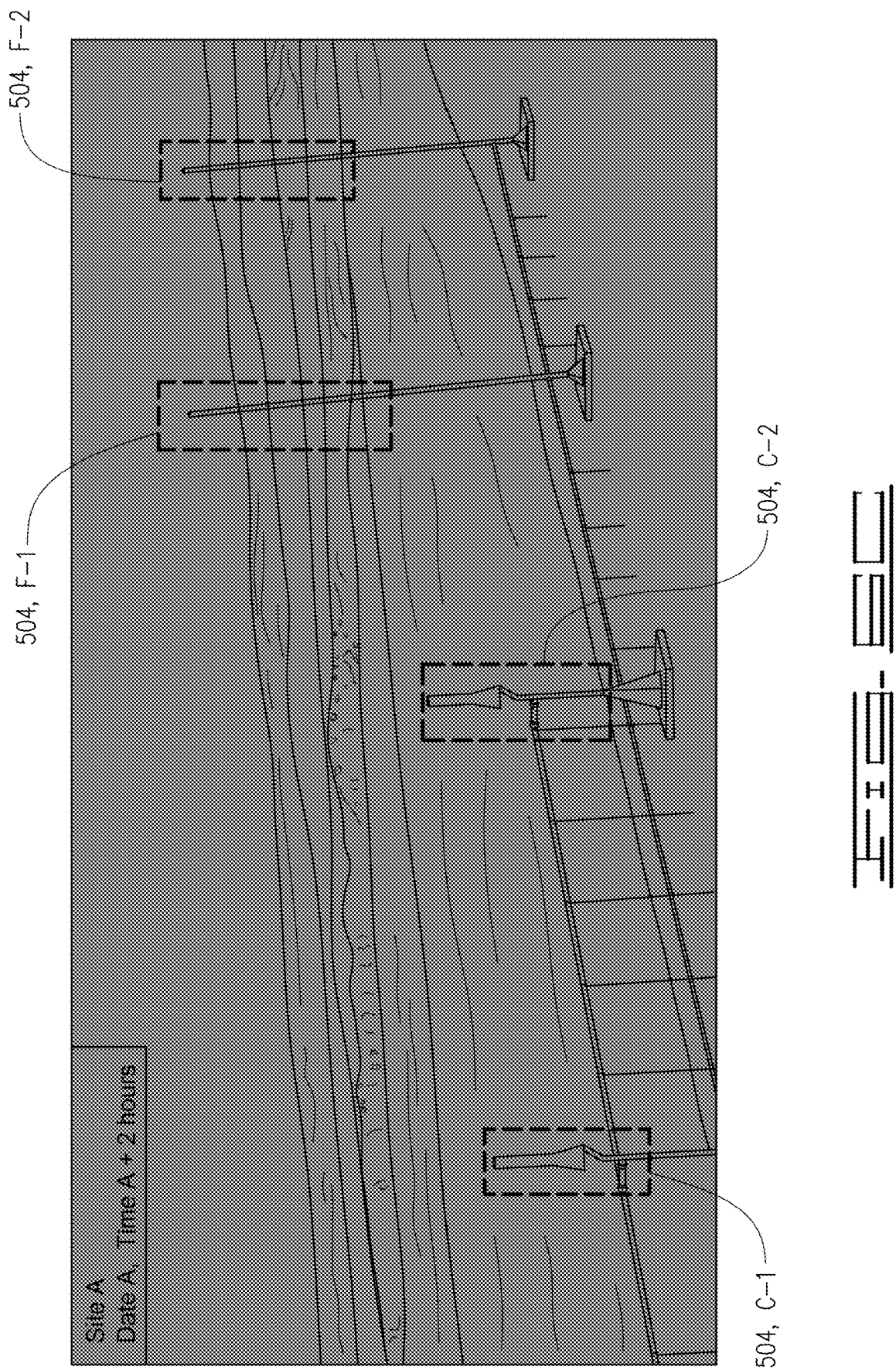

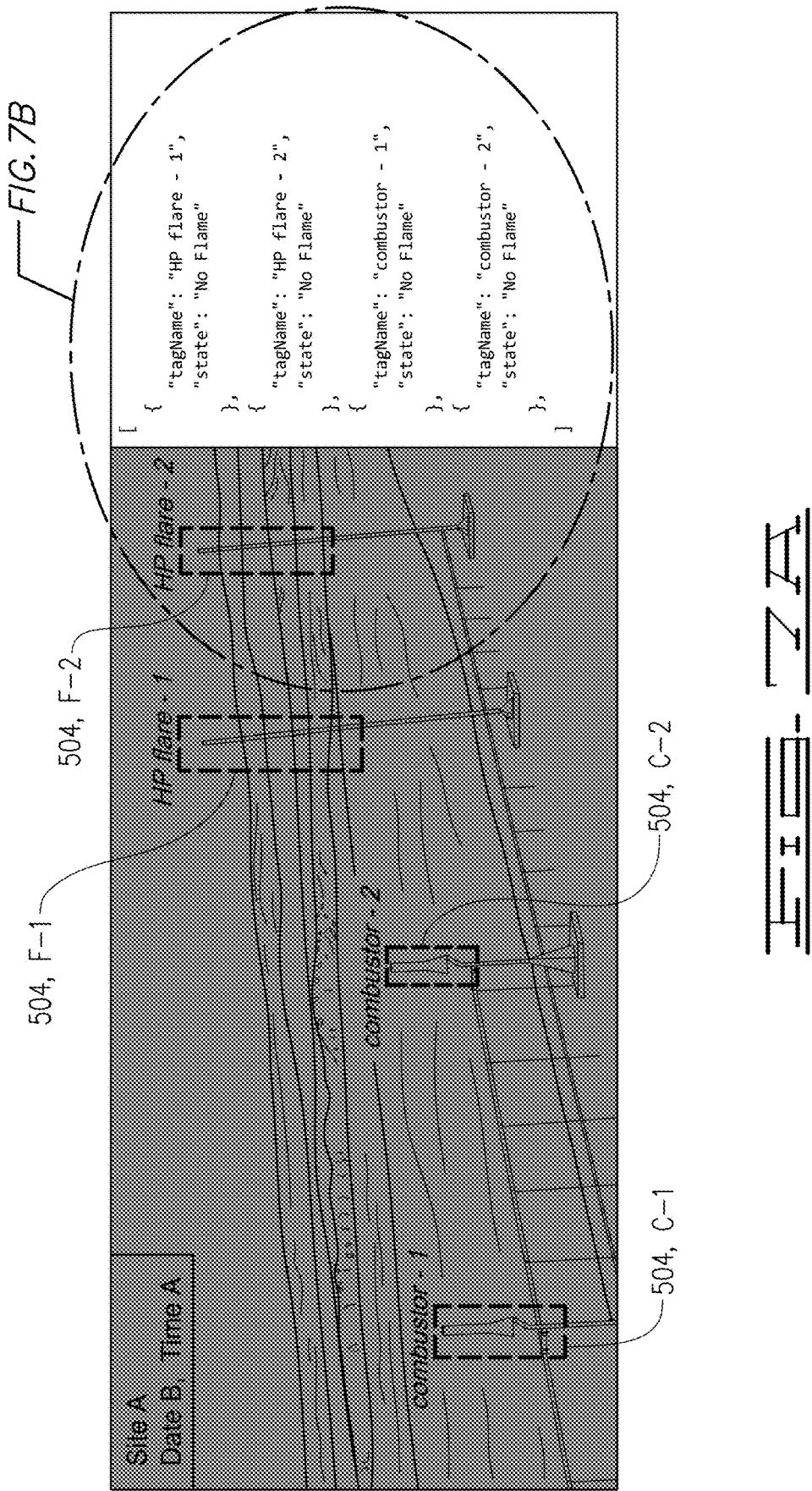

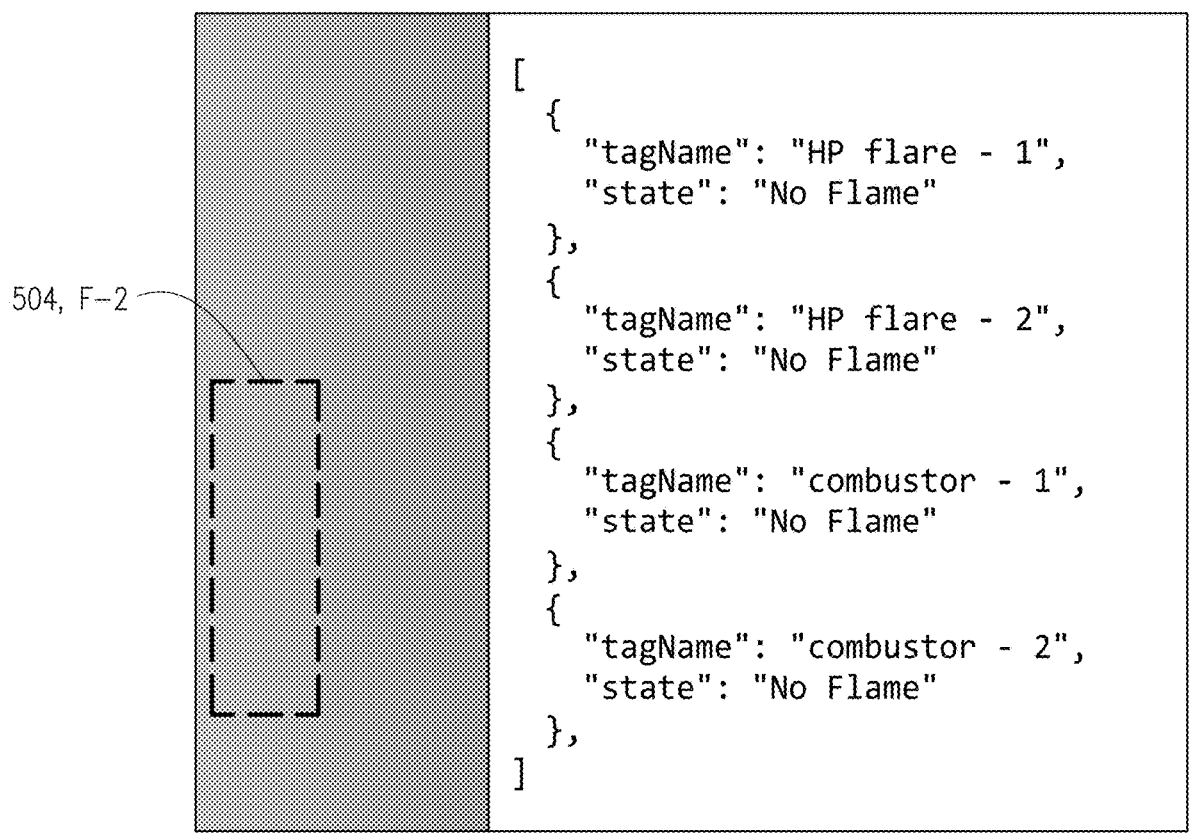
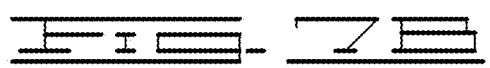

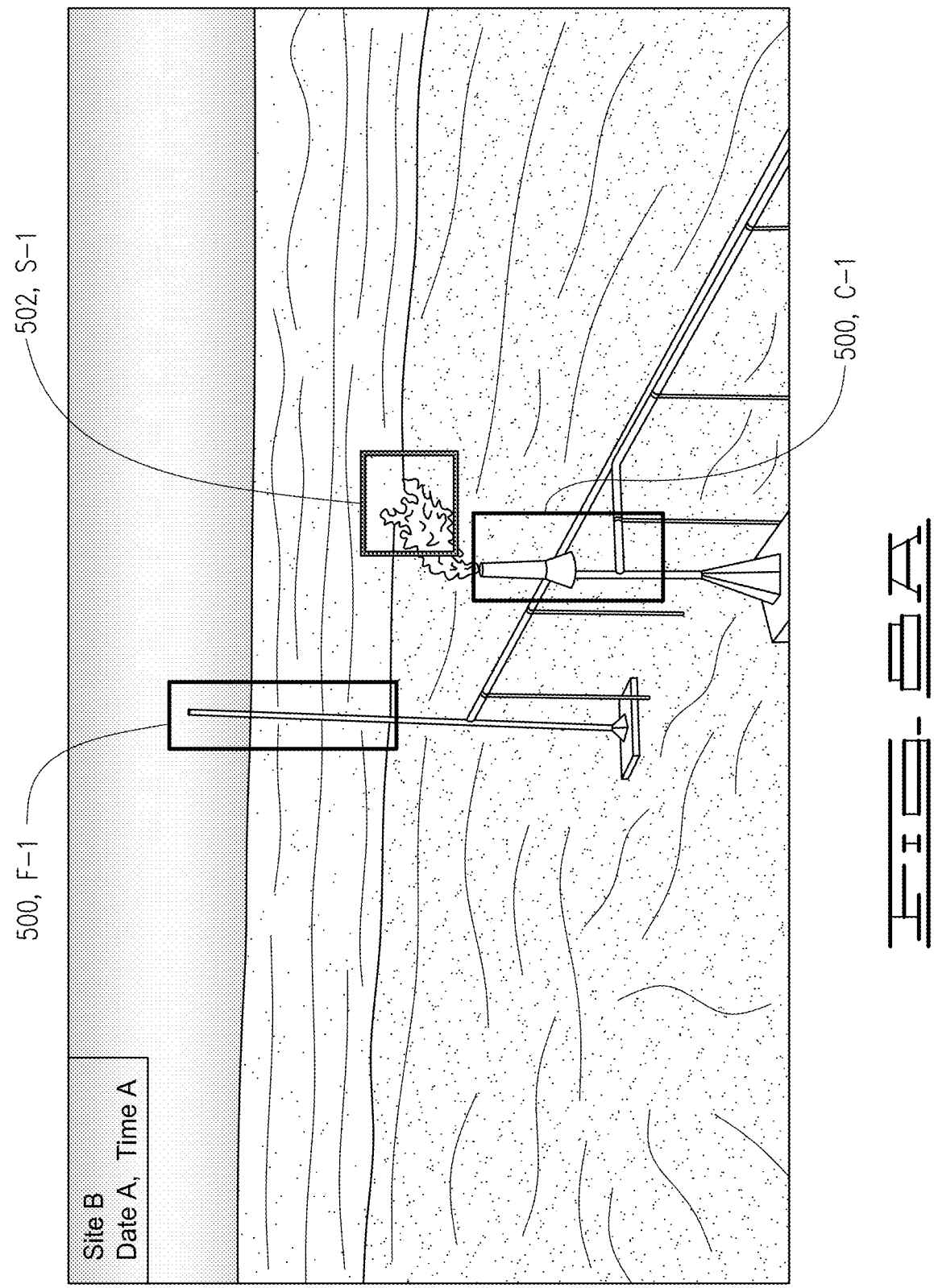

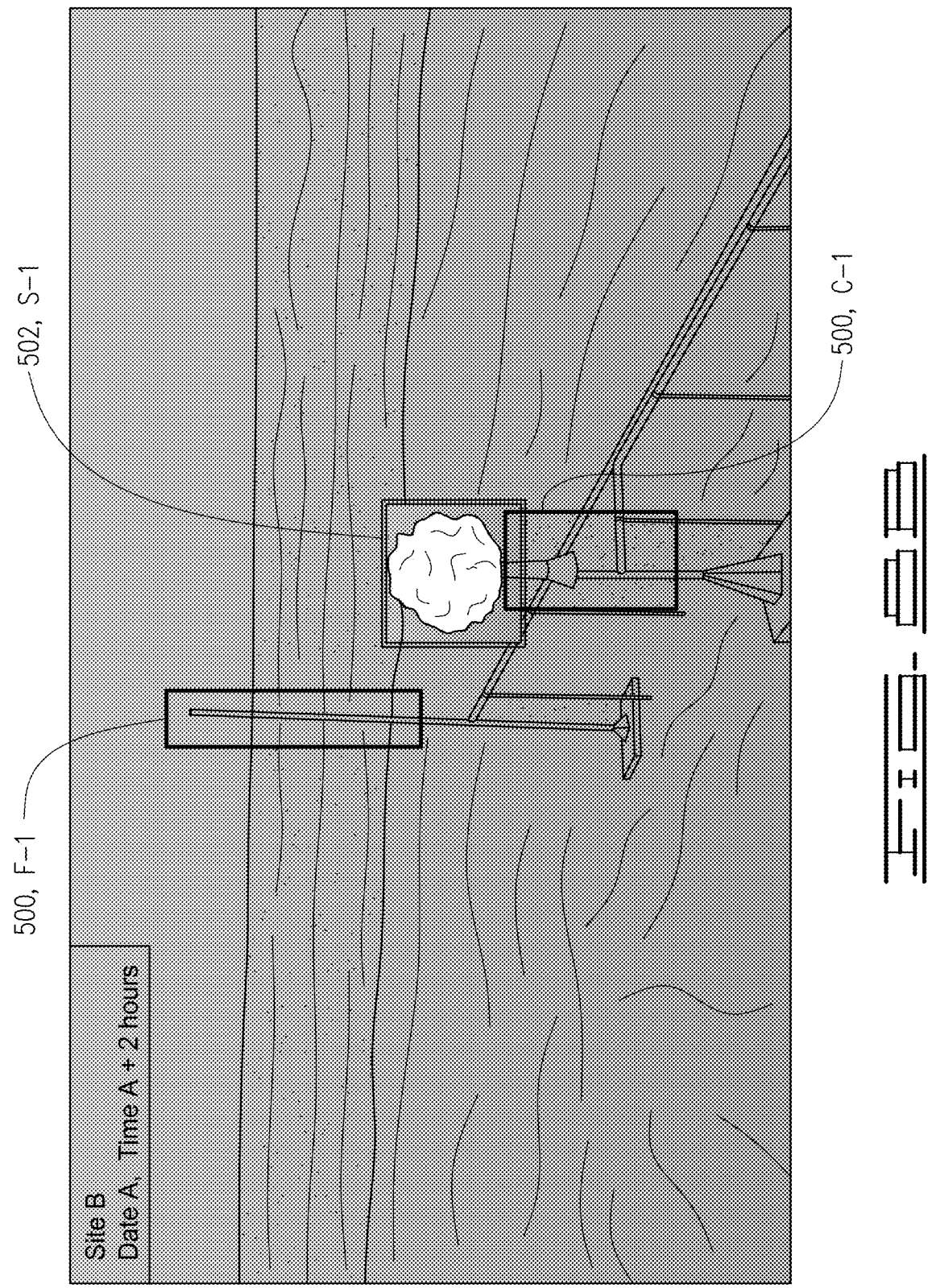

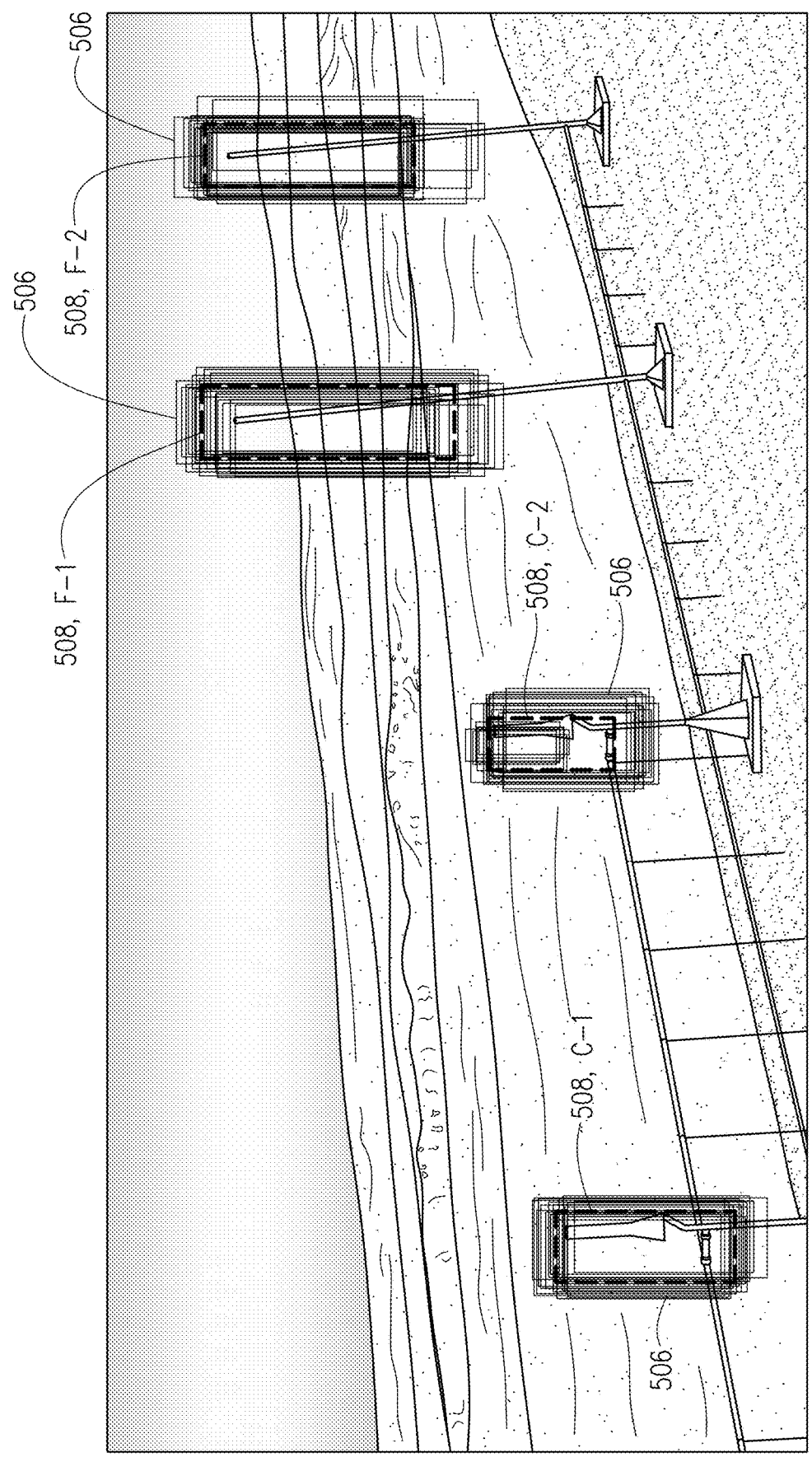

SYSTEMS, METHODS, AND COMPUTER PROGRAM PRODUCTS FOR OBJECT DETECTION AND ANALYSIS OF AN IMAGE

CROSS-REFERENCE TO RELATED APPLICATIONS

This application is a continuation of U.S. Non-Provisional application Ser. No. 17/493,252, filed on Oct. 4, 2021, now allowed, which claims the benefit of prior-filed U.S. Provisional Application No. 63/119,735, filed on Dec. 1, 2020, the entirety of which all are incorporated by reference herein.

TECHNICAL FIELD

The present disclosure relates generally to systems, methods, and computer program products for image analytics, and more particularly to utilizing object detection models to identify objects and locate and detect features in an image and coupled with automated learning to identify the location of an object during periods of low visibility.

BACKGROUND

For ease of discussion and illustration purposes only, and not by way of limitation, the systems, methods, and computer program products of the present disclosure are made in reference to image analytics to identify objects and locate and detect features or other information relating to such objects or features within an image a wellsite as well as utilize automated learning to identify an approximate location of an object in an image during periods of low visibility.

The image analytics systems, methods, and computer program products of the present disclosure are not limited to such environment and are also applicable and suitable to any other environment or end-use where there is a need to locate, detect, or identify features and/or objects of interest in an image.

For example, in the context of a wellsite setting, it is not commercially feasible or practical to have an individual on site at all times nor to have an individual remotely monitor all sites and equipment at all times. The described systems, methods, and computer program products of the present disclosure aids an organization by automating a portion of the monitoring of sites and generating alerts. The foregoing is used for enhancing safety, security, and environmental compliance to daily operations. For example, some equipment at wellsites may prove to be too dangerous or too difficult for an individual to access for visible inspection. In periods of low visibility, e.g. night, adverse weather, or obstruction, equipment may need to be monitored and/or inspected either in-person or remotely, and the described embodiments enable an organization to achieve such results through the use of existing or other low-cost and non-specialized equipment.

SUMMARY

A computing system comprising: one or more processors; one or more computer readable storage media operably coupled to at least one of the processors; and program instructions stored on the one or more computer readable storage media for execution by at least one of the processors to cause the computing system to perform the actions of: learning an object's location in an image by clustering a group of detected objects by a centroid for each detected object.

A computer-implemented method of learning an object's location in an image through a clustering technique, the method comprising: grouping, by a computing system, detected objects by a centroid for each detected object, thereby creating a cluster; calculating a geometric average of the cluster; and determining whether a calculated geometric average of the cluster meets or exceeds a minimum lighting threshold.

A computer program product for learning an object's location in an image through a clustering technique, the computer program product stored in a computer readable storage medium, comprising program code that, when executed by the computing system, cause the computing system to perform actions comprising: grouping detected objects by a centroid for each detected object, thereby creating a cluster; calculating a geometric average of the cluster; and determining whether a calculated geometric average of the cluster meets or exceeds a minimum lighting threshold.

BRIEF DESCRIPTION OF THE DRAWINGS

The figures included with this application illustrate certain aspects of the systems, methods, and computer program products described herein. However, the figures should not be viewed as exclusive representations or limiting. The subject matter disclosed is capable of modification or alteration in form and function, as will occur to those skilled in the art with the benefit of this disclosure.

FIG. 1 depicts a simplified block diagram that shows an example of a computing system for object detection and analysis of an image.

FIG. 2 depicts a simplified block diagram of an example system according to example embodiments of the present disclosure.

FIG. 4 depicts a schematic flow diagram illustrating a clustering process for learning an object's placement in an image.

FIGS. 6A-6C are sample annotated images showing information generated by an intelligent image analytics system according to example embodiments of the present disclosure.

FIG. 7A is a sample annotated image showing information generated by an intelligent image analytics system according to example embodiments of the present disclosure.

FIG. 7B is a close-up view showing some information depicted in FIG. 7A.

FIGS. 8A and 8B are sample annotated images showing information generated by an intelligent image analytics system according to example embodiments of the present disclosure.

FIGS. 9A and 9B are sample annotated images illustrating a visual depiction of part of the clustering process depicted in FIG. 4.

DETAILED DESCRIPTION

Figure 3:
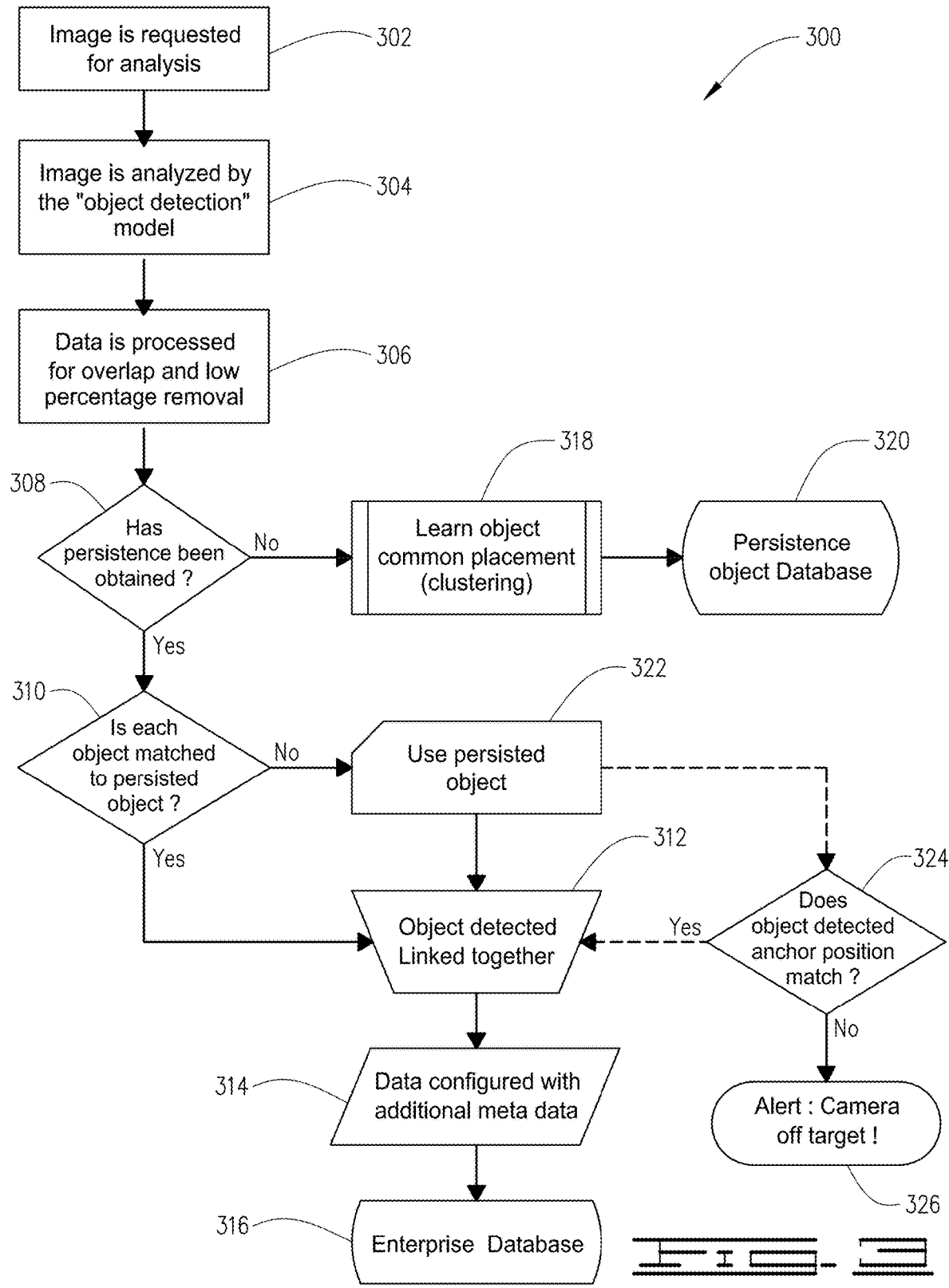
FIG. 3 depicts a schematic flow diagram of the intelligent image analytics system according to an example embodiment.

For ease of discussion and illustration purposes only, the present disclosure is made in reference to image analytics to identify objects and other information relating to objects within an image at a wellsite. Such reference to use of the presently disclosed system and method as applied to a wellsite should not be construed as limiting the present disclosure. The disclosed method and system are also applicable to any other environment or end-use where there is a need to identify objects and other information related to the object, regardless of the visibility level of the object in the image.

This example is provided for readability purposes only and the present disclosure should not be construed as limited to such use and application. For example, the present disclosure is suitable for any environment in which objects, the location of said objects, and other information regarding the detected objects need to be monitored regardless of the visibility level of the object in the image.

Computing systems of any number or type are suitable for implementing the intelligent image analytics system and performing the methods, techniques, processes, and executing the computer program products, instructions, and/or components described herein. FIG. 1 is an example simplified block diagram for computing system 100. Computing system 100 may include one or more computing devices 102 of the same or different types, and each one or more computing devices 102 may be operably connected to one or more input/output (I/O) devices 108. Computing device is representative of various forms of computing devices, including, without limitation, mainframes, desktops, laptops, workstations, servers, mobile or portable devices, such as personal digital assistants, tablets, smart-phones, cellular telephones, and other computing devices, and may be utilized to execute the various software components and computer program products presented herein.

Computing system 100 may include one or more central processing units (CPU) 104. CPU 104 includes one or more processors reading and/or executing instructions, programs, or applications stored therein, stored in memory 106, stored on computer readable storage media of computing device 102 or of I/O devices 108, or any combination of the foregoing. The one or more processors are also capable of accessing and/or storing data in memory, in processors, and/or computer readable storage media of the computing device or of I/O devices, or combinations of any of the foregoing. CPU is operably connected with memory 106. CPU 104 is also operably connected with I/O devices 108 through any applicable interface component for the corresponding I/O device 108, e.g. port (serial, parallel USB), wire, card (sound, video, network), or the like. Exemplary, and non-limiting, types of CPUs may include general purpose processors, digital programmable devices, microcontrollers, digital signal processors (DSPs), application specific integrated circuit (ASIC), and field programmable gate array (FPGA), and the like, or other components and combinations thereof designed to perform the functions described herein. Memory 106 includes data storage, volatile memory, e.g. random access memory (RAM), and non-volatile memory, e.g. read only memory (ROM) or non-volatile RAM (NVRAM), and other types of memory known in the art.

Computing system 100 and computing device 102 may operate in a networked environment using connections to remote computing devices and computing systems through a network 206, such as a local area network (LAN), wide area network (WAN), peer-to-peer networks, grid computing infrastructures, the Internet, and other network types known in the art. I/O devices 108 include various devices that a user may use to interact with computing system 100 or computing device 102. Representative I/O devices 108 include keyboards, touchscreens, mouse and other pointing devices; image input or capturing devices, such as a camera, video camera, thermal camera, and other image capturing devices; a visual display device, such as a cathode ray tube, liquid crystal display, screens, touch screens, and other suitable display devices for visually communicating and interacting with the user; audio devices, such as a microphone, headphones, speakers; and print devices for printing, scanning, faxing, and/or transmitting data and images. I/O devices 108 may also include computer readable storage media, e.g. mass storage devices, disks, magnetic disks, optical disks, magnetic tape, flash memory, RAM, ROM, EEPROM, or any other media that can be used to carry or store computer-readable information. I/O devices 108 may also include a communication device for connecting computing system 100 with one or more other computing systems over a network, e.g. wired and/or wirelessly, utilizing one or more communications protocols, e.g. IEEE 802.11, IEEE 802.3, TCP/IP, cellular protocols, any other communications protocols, and combinations thereof. Computing system 100, including computing device 102, may each include one or more communication devices and applicable controller(s) for connecting computing system 100 or computing device 102 with one or more other computing systems and/or computing devices, such that I/O devices 108 are integral with and are part of computing device 102 and not a separate component therefrom, e.g. built-in cameras, microphones, speakers, network connection devices, and other built-in components.

Computing system 100 may include one or more I/O devices 108 of the same type or of different types and combinations thereof and one or more computing devices 102 of the same type or of different types and combinations thereof and all of the foregoing operably connected to each other.

The systems, functions, methods, or algorithms described herein may be implemented in hardware, software, firmware, middleware, or any combinations thereof. When implemented in software, the described methods, processes, techniques may be stored in memory, computer-readable storage media, and/or combinations thereof and transmitted as one or more instructions or code to cause one or more computing systems 100, including any applicable processor (s) to operate in accordance with the teachings of the present disclosure. The operable connection of the various components of computing system 100 described in reference to FIG. 1 include buses, circuitry, wires, wireless, or other connections. The functions, methods, and techniques described herein may be implemented by one or more computing system in cooperation with each other. The components of computing system 100 shown and described, including their relationships and functions, are exemplary and are not to limit the implementation of the systems, methods, techniques, and computer program products described herein.

Referring now to FIG. 2, there is illustrated one embodiment of an example image analytics system 200. For example, as images are captured and analyzed, data may be passed by a plurality of computing systems 100 located at the same or different locations to one or more databases 204 via network 206. The one or more databases may be at a remote server 202 at a different location or server 202 may be a local server at the location of interest. Data may be provided in real-time to the one or more databases 204 as well as to any user on their respective computing system 100.

FIG. 3 depicts a schematic flow diagram of an example intelligent image analytics system. The image analytics system is configured to request (automatically or manually via user-initiation) an image at step 302 for analysis by an object detection model. The object detection model may be any suitable object detection model preconfigured to carry out and achieve the functionality described herein.

An image is obtained by an image capturing device, e.g. a camera. The camera may be any suitable camera, including a digital camera, thermal camera, infrared camera, a stationary camera or a camera having pan, tilt, zoom (PTZ) capabilities, or a camera having one or more of the aforementioned features and capabilities.

For example, in a wellsite setting, the object detection model may be trained to recognize and classify certain equipment found at a wellsite, such as a combustor (labelled as C-1, C-2, C-N in the figures) or a flare (labelled as F-1 . . . F-N in the figures), and states (or conditions) of various equipment or other states of interest, such as a flame (labelled as S-1 . . . S-N in the figures).

At step 304, the captured image is analyzed by the object detection model. For each captured image, the output from the object detection model includes various data elements, including object classification, probability of confidence of the detected/classified object, and data related to the approximate location of the detected/classified object within the image. For example, with reference to FIGS. 9A and 9B, bounding boxes labelled 506 are example visual representations of the data related to the approximate location of the detected/classified object that is output from the object detection model and bounding boxes labelled as 508 are the averages of bounding boxes 506. As will be described elsewhere, bounding box 508 is representative of a bounding box labelled as 504 and corresponds to the persistent location of a given object. For example, as an exemplary known methodology in the art, the object detection model analyzes an image by segmenting or dividing the image into multiple regions or grids that may overlap. As a result, the object detection model will detect and classify the same object in the image multiple times with varying degrees of confidence and approximate locations for the given object.

At block 306, data is processed for overlap and low percentage removal. The intelligent image analytics system, method, and computer program product are configurable such that a user can define and set the system, method, and computer program product to focus on specific objects that meet a desired probability threshold. The user-configurable probability threshold can be adjusted for each object classification category for a given end-use application or environment. Step 306 removes outliers, e.g. those detected/classified objects that do not meet or exceed the probability threshold. For those detected/classified objects of the same type and assigned the same tag name, e.g. F-1 or C-2, that are touching, i.e., overlapping, the data related to the detected object having the highest probability (or location confidence) is kept.

Figure 5A:
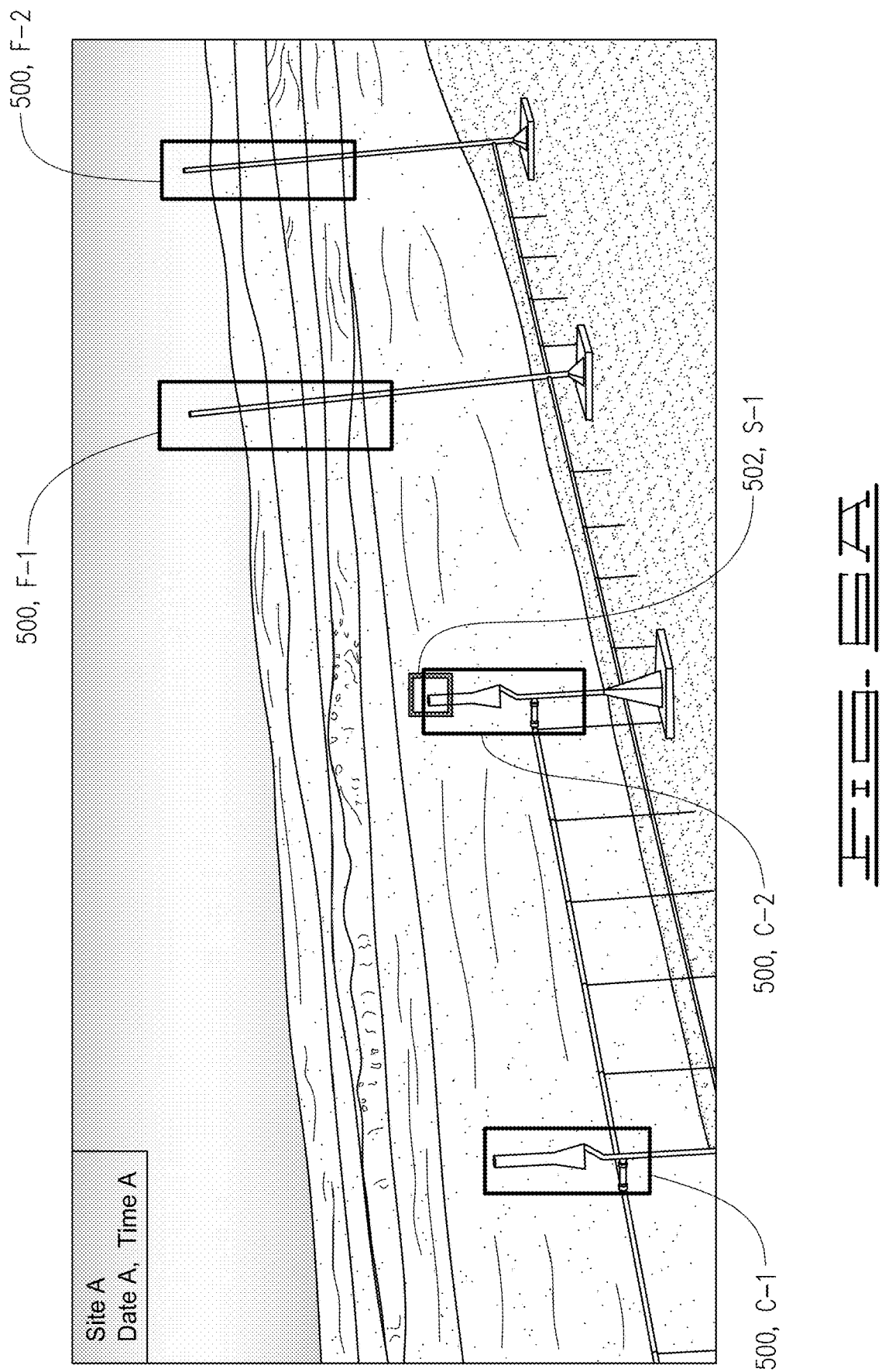
FIG. 5 is illustrative of the different visual indications produced to a viewer by the intelligent image analytics system, method, and computer program product.
Figure 9A:
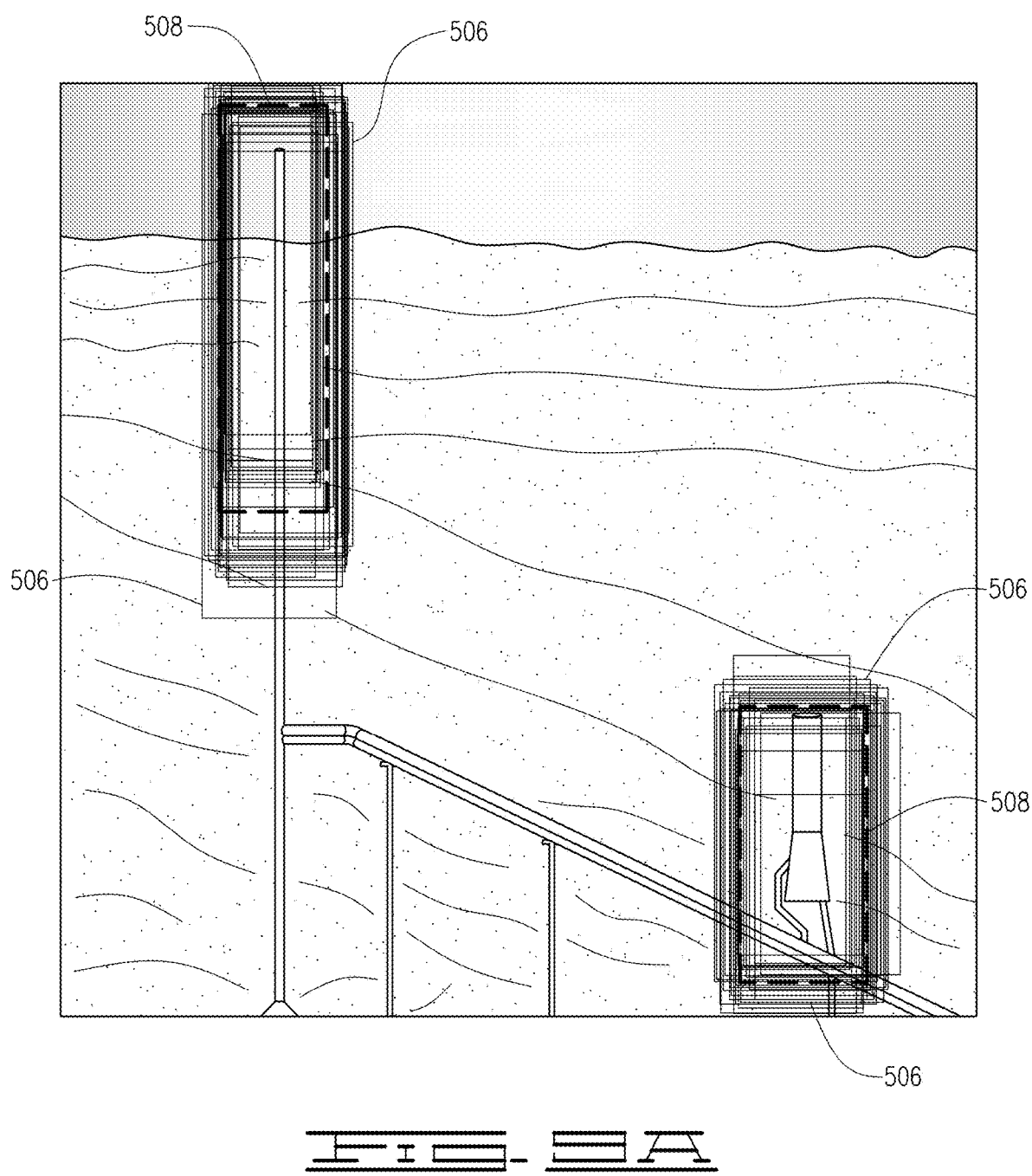

At block 308 a determination is made if persistence has been obtained, meaning a determination is made as to whether the intelligent image analysis system, method, and computer program product have learned the approximate location for the given detected and classified object and that the learned approximate location is saved in the persistence object database 320 for use during low or adverse visibility conditions. As illustrated in FIGS. 9A and 9B, objects designated with reference numeral 508 correspond to an approximate location of an object, and once the object achieves persistence, then such approximate location may be visually rendered with reference numeral 504, as illustrated in FIG. 5, to convey certain information to a viewer of the analyzed image.

For example, the intelligent image analytics system and computer program product are configurable to set a minimum threshold as to the number of image iterations needed to be collected and analyzed during high visibility hours, e.g. sunlight hours, before persistence of the object can be obtained. The process relating to obtaining persistence is described further in reference to FIG. 4.

If the determination at block 308 is in the affirmative, then a subsequent determination at block 310 is made as to whether each object identified in the image is matched to a persisted object contained in the persistence object database. For example, the detected/classified object is considered "matched" when its X/Y centroid values are within a predefined percentage threshold of the geometric average (or GeoAvg) of the persisted object. As will be described elsewhere, the GeoAvg is result of process 318 when the intelligent image analytics system has learned the approximate location of the given object of interest. The predefined percentage threshold for "matching" may be adjusted based on need or for changing conditions, environments, and end-use applications where the intelligent image analytics system, method, and computer program product are used.

The process proceeds to step 312 if the determination at 310 is in the affirmative. At step 312, the object(s) detected for a given image are linked together. For example, in the context of a wellsite, multiple types of objects could be found in an image. Some of these objects reflect the activity state of an object. For example, a flame and a flare may be detected in an image. If the flame is within the "combustion zone" of the flare, then the intelligent image analytics system is configured to determine that the flare (F-1 to F-N) is "on", e.g. operating properly. For example, a "combustion zone" is the area in which a flame is anticipated. The intelligent image analytics system is configured with one or more criteria, conditions, and/or thresholds to employ in order to link the detected objects together at step 312.

The above was an illustrative and non-limiting example as to how the image analytics system, method, and computer program product are configurable to link detected objects together. For any application, objects may be linked together by predefined thresholds, criteria, and/or relationships for the applicable end-use the intelligent image analytics system, method, and computer program product are utilized.

At 314, additional meta data may be added and associated with the one or more detected objects in the image. Additional meta data could be any information that the user of the intelligent image analytics system deems useful or desirable. For example, in the non-limiting example of a wellsite, additional meta data can be timestamps, a description or name of the facility, equipment identification (e.g. serial number), data from other sources, such as location weather data, or flare pilot temperature data. The additional meta data may be obtained by other data sources, such as a programmable logic controller, other automated logic devices, repository data sources, or manually entered during installation and configuration of the intelligent image analytics system for the end-use application or environment.

An example of tag names and meta data associated with an image and the objects therein is illustrated in FIG. 7B. Such tag names or state conditions may be applied at either or both steps 312 and 314. FIG. 7A is an example illustration of a visual depiction of the various data elements and meta data visually represented on an image. FIG. 7B illustrates a programmatical representation of some of the same data elements.

At step 316, one or more data elements obtained in the prior steps are provided to and stored in a database, such as an enterprise database. The image itself and/or the annotated images may also be provided to and stored in the database. The database may be at the same location of the image capture devices or may be remote from such devices, such as database 204 depicted in FIG. 2.

If the determination of whether persistence has been obtained at 308 is in the negative, meaning that the intelligent image analytics system has not yet learned of the classified object's location, then the process proceeds to subprocess 318 to learn the object's common placement within a given image via a clustering technique which will be described in reference to FIG. 4.

The intelligent image analytics system is configured such that all images and data associated therewith are stored in database 320, including information regarding analyzed images that include objects that have obtained persistence. Upon certain triggering events, such as a detected object obtaining persistence, such information regarding persistence will also be stored and associated with the detected object in database 320.

If the determination of step 310 is in the negative, meaning that each object in the image is not matched to a persisted object, then the stored persisted object 322 from persistence object database 320 that is the expected object for a given location in the image is used as part of the action(s) to be taken at step 312. Stated differently, process 300 is using the stored approximate location of the object in database 320 as the visibility conditions for the given object in the image may be too poor to use the real-time analysis for identifying the approximate location of the object. For example, visual indicator 504 is representative of a visual representation of the object's approximate location taken from the persistence database and visual indicator 500 is a visual representation of an object's approximate location that is rendered from the real-time analysis for identifying the approximate location of the object.

Visual indicators may be depicted in different colors, shapes, patterns, and labels, or any combination of the foregoing to allow a viewer of the processed image to visually distinguish between the detected/classified objects and provide a visual indication to a viewer how the intelligent image analytics system, method, and computer program product determined the approximate location of the object. For example, in FIGS. 6A and 6B the approximate locations of combustors C-1, C-2, and flares F-1, F-2 are bounded with visual identification box 500 that can be shown in an assigned color or pattern. State or conditions, such as a flame state shown in FIG. 6A with label S-1 is depicted with a visual identification box 502, which is a color or pattern different from that of bounding box 500 and 504. Additionally, bounding box 500 is indicative of the object being detected in the image via real-time analysis, e.g. not a low visibility condition. FIG. 6C depicts the same objects of FIGS. 6A and 6B but at a different time when visibility conditions are poor and the image analytics system, method, and computer program product used the stored location of the objects, C-1, C-2, F-1, and F-2 from the persistence object database 320 to identify the approximate location of the object(s) in the image for the given low visibility condition. The pattern or color of the approximate location of the objects is depicted with bounding box 504.

For example, the process may also optionally include step 324 to determine if the object detected anchor position matches. For example, the physical items of interest to be analyzed may be equipped with a target or anchor for the image capturing device to aim at when an image is captured for analysis by the image analytics system. For example, another approach for detecting an anchor position is to provide the image analytics system and computer program product with an initial or baseline PTZ coordinates of the camera. When each image is taken and analyzed, the current PTZ coordinates of the camera for the given image are provided to the image analytics system to perform a comparison of the current PTZ coordinates with the baseline PTZ coordinates. A threshold of acceptable variance between the current PTZ coordinates and baseline PTZ coordinates is also predefined.

If the determination at 324 is in the affirmative, then the process proceeds to step 312 as depicted in FIG. 3. If the determination of block 324 is negative, then an alert can be generated that the camera is out of alignment or otherwise off target and appropriate corrective action can be taken.

FIG. 4 depicts subprocess 318 of learning an identified object's common placement via a clustering technique. This subprocess occurs if it is determined that the persistence of the detected object has not been obtained at determination step 308 of FIG. 3.

The image analytics system, method, and computer program product are configurable to capture an image at a frequency depending upon the end-use application. For example, the system may be configured to take an image every hour for analysis. In addition, the system may also be configured to take an image on-demand at the instruction of a user.

At step 402, the detected objects are grouped by their centroids. As can be seen in FIGS. 9A and 9B, multiple boxes, labelled as 506, are positioned around the detected/classified object of the same type as previously described in reference to step 306. As previously described in reference to step 306, each bounding box 506 represents an approximate location of the detected/classified object.

A geometric average (GeoAvg) of the grouping of step 402 is calculated at step 404. The geometric average is visually represented in FIGS. 9A and 9B as bounding box 508. Bounding box 508 may be visually distinct from bounding boxes 506 as shown in FIGS. 9A and 9B.

At step 406, a determination is made as to whether the current image that is being analyzed meets a minimum daylight threshold. For example, the minimum daylight threshold can be adjusted for a particular end-use or environment in which the image analytics system, method, and computer program product are used. For example, other factors relating to the minimum daylight threshold and its adjustment thereof include information relating to solar events, such as sunrise and sunset, the location, e.g., latitude and longitude, seasonal shifts, e.g. the earth's tilt/position with respect to the sun.

The described image analytics system, method, and computer program product are not limited to outdoor environments and may be employed in indoor settings or mixed environment, i.e., indoor and outdoor, settings. If utilized indoors or in a mixed environment, the minimum daylight threshold corresponds to a minimum lighting threshold.

If the minimum daylight threshold of determination 406 is met, then the calculated geometric average of the cluster from step 404 becomes the learned location of the object, i.e, it has obtained "persistence" and such persisted information is associated with the given object in database 320.

The process will continue to 410, which corresponds to returning to the next image capture iteration of step 302 in FIG. 3. Not depicted in FIG. 4 is a determination step that occurs following step 408. A determination is made if the recent object clusters for the object deviate beyond a predefined threshold from the data associated with the same object that is in the persistence database. If the object is not yet in the persistence database, then this determination does not occur and the process continues to 410.

For example, "recentness" can be of any temporal duration depending upon the end-use of the intelligent image analytics system, method, and computer program product. For example, the temporal duration for "recent" clusters can be configured to be the past few hours, days, or any other configurable duration depending upon the sensitivity needed for the end-use application. If the recent clusters deviate a sufficient amount from the persistence value, then the object is passed to the persistence database 320 for that object and the process continues on to 410. Such action enables the persistence information related to an object to be finely tuned and accurate due to changing conditions over the time period it took to obtain persistence.

If the determination of step 406, that the minimum light threshold is not met, subprocess 318 proceeds to step 412 to determine if a minimum number of image iterations has been met. The intelligent image analytics system, method, and computer program product are configured to obtain a configurable minimum number of image iterations (or object detections/classifications) before "persistence" can be obtained. For example, in the illustrated wellsite examples, twelve (12) iterations of a given detected/classified object in sufficient lighting is needed before persistence is obtained.

If the determination of step 412 is in the affirmative, subprocess 318 proceeds to step 414 to determine if each object cluster contains the minimum number of members (or the detected/classified object). Similar to the minimum number of iterations needed, the minimum number of members is configurable for the end-use and/or environment. This minimum number of members can be the same as or different from the number of iterations needed before the detected/classified object is eligible to obtain "persistence". For example, stated another way in relation to steps 412 and 414, for an object to obtain persistence, it needs to have a minimum number of images obtained during sufficient lighting and of those images with sufficient lighting the object needs to be detected/classified a minimum amount of times.

If the minimum number of members of step 414 is met, then the subprocess proceeds to step 408 and proceeds as previously described in relation to step 408.

If the minimum number of members of step 414 is not met, then the subprocess ends at 416, as more image iterations are needed before persistence can be obtained. The information and data associated with the analysis of the given image is retained in database 320. Accordingly, image analytics system and process will return to step 302 of FIG. 3 for the next iteration of analysis of the image at the predefined frequency and subprocess 318 will repeat until persistence is obtained.

Some features and benefits of the disclosed system, method, and computer program product include: a persistence analysis used to learn where "key objects" or objects of interest are located within an image for placement verification in low visibility situations; enables real-time image analytics. Images are collected in real-time from image input devices, e.g., cameras located on production facility wellsite and are passed through passed through object detection model(s) that are configured to locate and detect certain features in the images to extract value adding data. Such value adding data may include labelling the identified objects, providing a visual indication of the approximate location of an object, regardless of whether the object is visible in the image, providing a visual indication of whether the approximate location was determined based on real-time analysis of the image or if a learned position is being utilized, and a state or condition; dynamic object 'clustering' over time to provide basis for learned object locations; ability to generate alerts, e.g., if a certain number of objects are expected to be identified for a given image but for a given threshold set of images the expected number of objects identified does not match the expected number, an alert can be generated; using 'persistence' object locating provides a higher confidence level of reliability and consistent data collection; and flexibility and scalability, for example, if a camera moves or additional cameras are added the system will eventually learn the new position of the objects as a result of the moved camera or will learn the position of the objections in the field of view of the added cameras after a sufficient number of image iterations have been captured.

Other features and benefits of the disclosed system, method, and computer program product include: the ability for the extracted data to be passed to and saved in a database for real-time and future user; the ability to learn where objects of interest (or target objects) are located and then continue to provide identification even when the objects may be difficult to recognize due to dynamic environmental conditions.

For example, when used in connection with wellsite operations, the described system, method, and computer program product help an organization to achieve reliable and continuous operations.

The use of ordinal number terminology (i.e., "first," "second," "third," "fourth," etc.) is for the purpose of differentiating between two or more items and is not meant to imply any sequence or order or importance to one item over another or any order of addition. The use of the phrase "or combinations thereof" as used herein refers to all permutations and combinations of the listed items preceding the term. The skilled artisan will understand that typically there is no limit on the number of items or terms in any combination, unless otherwise apparent from the context. The use of the term "or" in the claims is used to mean "and/or" unless explicitly indicated to refer to alternatives only or the alternatives are mutually exclusive, although the disclosure supports a definition that refers to only alternatives and "and/or."

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As previously discussed above, the present disclosure describing use of the systems, methods, and computer program products in a wellsite setting is for illustrative purposes only and should not be construed as limiting.

Although certain steps or logic flows are described herein and/or illustrated in the figures as occurring sequentially, some steps or logic flows may occur simultaneously with each other or in an order that is not depicted or described to achieve the described results. Other steps may be provided, or steps may be eliminated from the described flows, and other components may be added to, or removed from, the various examples of the image analytics systems, methods, and computer program products of the present disclosure.

While various implementations have been described herein, such descriptions are presented by way of example and are not to be limited to the precise descriptions and illustrations. Accordingly, numerous modifications and variations are possible by those skilled in the art without departing from the spirit and scope hereof, as defined by the following and later-submitted claims and their equivalents. The breadth and scope of the present disclosure should not be limited by any of the implementations and illustrations described herein, but should be defined only in accordance with the following and later-submitted claims and their equivalents.

What is claimed is:

1. An image analysis method comprising:
   a. capturing a plurality of images with an image capturing device over a period of time;
   b. detecting an object of interest in each of the images with an object detection model;
   c. determining the approximate location of the object of interest in each of the plurality of images with the object detection model;
   d. clustering the approximate locations of the object of interest in the plurality of images to learn the approximate location of the object of interest;
   e. storing the learned location of the object of interest as a persisted object of interest in a persistence object database;
   f. repeating steps a-e for a plurality of objects of interest;
   g. capturing an image in real time in which a specific object of interest is expected to be visualized; and
   h. determining whether the specific object of interest can be visualized in the real time image, wherein
   i. if the specific object of interest is visualized, matching the specific object of interest with a persisted object of interest in the persistence object database; and linking the visualized specific object of interest with an additional feature in the real time image; and wherein if the specific object of interest cannot be visualized in the real time image;
      (1) identifying a persisted object of interest from the persistence object database that is at the expected location of the specific object of interest;
      (2) linking the identified persisted object of interest with an additional feature in the real time image; and
      (3) determining whether the additional feature is properly located relative to the location of the identified persisted object of interest.

2. The image analysis method of claim 1, wherein the specific object of interest is a flare, and the feature in the real time image is a flame.

3. The image analysis method of claim 1, wherein if the specific object of interest is visualized in the real time image, determining whether the additional feature is in the anticipated location relative to the specific object of interest.

4. An image analysis system comprising:
   an image capturing device;
   one or more processors operably coupled to the image capturing device;
   one or more computer readable storage media operably coupled to at least one of the processors;
   one or more persistence object databases having the approximate location of a plurality of persisted objects of interest stored thereon;
   program instructions stored on the one or more computer readable storage media for execution by at least one of the processors to cause the image analysis system to perform the actions of requesting, by one or more of the processors, a real time image in which a specified object of interest is expected to be located;
   determining whether conditions in which the real time image was captured are such that the specified object of interest can be detected and located in the real time image;
   wherein if the conditions are such that the specified object of interest in the real time image can be detected and located, matching the specified object of interest in the real time image to a persisted object of interest in the persistence object database; and linking the specified object of interest with an additional feature in the real time image; and wherein if the conditions are such that the specified object of interest in the real time image cannot be detected and located, the program instructions stored on the one or more computer readable storage media further cause the image analysis system to perform the actions of:
      identifying a persisted object of interest from the persistence object database that is at the expected location of the specific object of interest;
      linking the identified persisted object of interest with the additional feature in the real time image; and
      determining whether the additional feature is properly located relative to the location of identified persisted object of interest.

5. The image analysis system of claim 4, wherein the specified object of interest is a flare, and the additional feature is a flame.

6. A computer-implemented method comprising:
   grouping, by a computing system, detected objects of interest in an image by a centroid for each detected object of interest thereby creating a cluster for each detected object of interest;
   calculating a geometric average of the cluster for each detected object of interest; and
   updating a database with the calculated geometric average of each detected object of interest, the geometric average of each detected object of interest comprising the approximate location of each detected object of interest in the image, the objects of interest in the database comprising persisted objects of interest;
   capturing an image in real time in which a specific object of interest is expected to be visualized; and
   determining whether the real time image was captured in lighting conditions that allow the specific object of interest to be visualized; wherein in response to a determination that the real time image was captured in lighting conditions that do not allow the specific object of interest to be visualized, the method further comprises determining whether a persisted object of interest in the database is at the expected approximate location of the specific object of interest.

7. The method of claim 6, wherein in response to a determination that the real time image was captured in lighting conditions that allow the specific object of interest to be visualized, the method further comprises determining whether the visualized specific object of interest is matched to a persisted object of interest.

8. The method of claim 7, wherein in response to a determination that the visualized specific object of interest is matched to a persisted object of interest, the method further comprises linking the visualized specific object of interest to another feature in the real time image.

9. The method of claim 8, wherein the visualized specific object of interest is a flare and the additional feature is a flame.

10. The method of claim 6, wherein in response to a determination that a persisted object of interest is at the expected approximate location of the specific object of interest, the method further comprising linking the persisted object of interest that is at the expected approximate location of the specific object of interest to another feature in the real time image.

11. The method of claim 10, further comprising determining whether the additional feature is located at an expected location relative to the persisted object of interest that is at the expected approximate location of the specific object of interest.

12. The method of claim 10, wherein the specific object of interest is a flare and the additional feature is a flame.

* * * * *